United States Patent [19]
Dawson

[11] 3,762,059
[45] Oct. 2, 1973

[54] CHECK GAUGE FOR SWAGED FITTING AND TUBE CONNECTIONS
[75] Inventor: James A. Dawson, Hazelwood, Mo.
[73] Assignee: McDonnell Douglas Corporation, St. Louis, Mo.
[22] Filed: June 21, 1971
[21] Appl. No.: 155,077

[52] U.S. Cl. ............... 33/174 G, 33/174 N, 285/93, 285/382.2
[51] Int. Cl. ........................... G01b 5/14, G01b 5/20
[58] Field of Search ..................... 33/174 G, 174 H, 33/174 K, 174 N, 168 R, 178 B

[56] References Cited
UNITED STATES PATENTS
1,881,651  10/1932  Judge ................................ 33/168 R
2,585,521  2/1952  Wandrus ........................... 33/174 G Primary Examiner—Stanley N. Gilreath
Assistant Examiner—Jon W. Henry
Attorney—Gravely, Lieder & Woodruff

[57] ABSTRACT

A check gauge for determining the acceptability of a swaged connection between a fitting and a tube where the fitting is swaged down over the tube and the tube must have a predetermined depth of penetration into the fitting.

6 Claims, 7 Drawing Figures

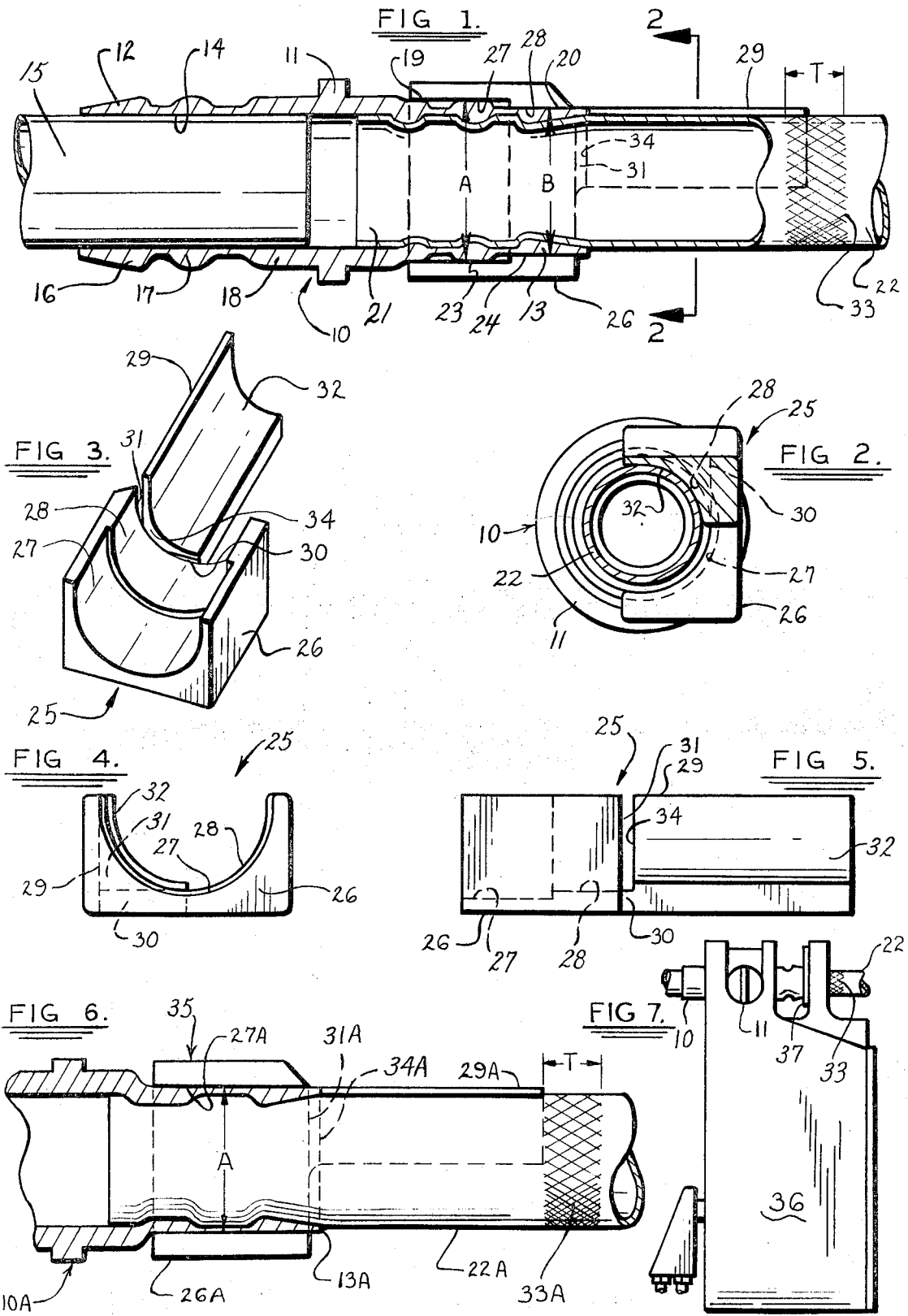

CHECK GAUGE FOR SWAGED FITTING AND TUBE CONNECTIONS

BRIEF BACKGROUND OF THE INVENTION

The use of swaged connections between tubes and fittings requires a predetermined length of grip on the tube by the fitting and a predetermined grip on the tube by reduction of the fitting circumferentially about the tube. There are, thus, several critical dimensions for the connections of this character, and the present gauge quite simply and easily effects the accurate checking of these dimensions in a handy and inexpensive tool.

The gauge herein disclosed is adapted to be used for approving or rejecting fitting-to-tube connections made by the swaging tool disclosed in my U.S. Pat. application, Ser. No. 28,578, filed Apr. 15, 1970, and it is useful with connections of the character shown in my U.S. Pat. No. 3,572,779 issued Mar. 30, 1971. After a joint has been swaged with the tool of said application it is inspected with the gauge of this invention to determine the physical results. This is followed by pressure checks as normally required. The gauge must fit on the fitting and the depth of tube insertion is simultaneously checked by means of the gauge extension or finger. When these checks are made the gauge shows that the swage diameter reduction is correct, that the length of the swage reaction is correct and that the tube insertion into the fitting is also correct. Thus, the gauge rapidly and visually checks the several characteristics of the swaging operation, requires a minimum of training and reduces failures in tubing systems employing swaged joints.

The gauge hereinafter described has the advantages of simultaneously checking the critical assembly dimensions for swaged fittings. It is especially unique as it eliminates the need to take measurements with scales, calipers or micrometers. The gauge itself has a cylindrical or U-shaped body which fits over the swaged fitting or sleeve to show that these parts have been properly swaged, and it has an extenison or finger which lies along the tube to check tube insertion in conjunction with a marking band previously imprinted or applied to the tube. The band is made to have a width which establishes the insertion tolerances permitted.

DESCRIPTION OF THE DRAWINGS

The presently preferred forms of gauge are illustrated in the accompanying drawings, wherein:

FIG. 1 is a fragmentary longitudinal sectional view of a swaged fitting and tube connection having two swaged diameters and showing a gauge for checking such a connection;

FIG. 2 is a sectional view of the gauge as applied to the connection, the view being taken at line 2—2 in FIG. 1;

FIG. 3 is a perspective view of the gauge itself for use with swage fitting connections of the type seen in FIG. 1;

FIG. 4 is an end view of the gauge of FIG. 3;

FIG. 5 is a side view of the gauge of FIG. 3;

FIG. 6 is a fragmentary longitudinal sectional view of a single diameter fitting and tube connection with a modified type of gauge for checking the connection; and FIG. 7 is a side view of a swaging tool to show the tube with the marking band located in its desired position prior to the swaging operation of the tool.

DETAILED DESCRIPTION OF THE EMBODIMENTS

In FIg. 1 the swaged fitting and tube connection shows a fitting 10 having a flanged body portion 11 and sleeves 12 and 13 extending axially in opposite directions from the body 11. The sleeve 12 is seen prior to swaging in the form where the internal surface 14 is cylindrical so as to receive the end portion of tube 15. the exterior of the sleeve 12 is formed with a plurality of circumferential enlargements 16, 17 and 18 which when swaged are pressed inwardly to imprint and grip the tube 15. At the right side of the fitting body the sleeve 13 is shown after being swaged such that two different cylindrical diameters are formed at 19 and 20. Comparing the left sleeve 12 with the right sleeve 13 it is observed that at the right sleeve 13 the circumferencial enlargements 17 and 18 have been transposed to the inside to deform and grip the innermost end 21 of the tube 22. this deformation by swaging leaves the exterior of the sleeve 13 with a first cylindrical diameter surface 23. The outer end of sleeve 13 is swaged to a smaller diameter at cylindrical surface 24 by transposing the circumferential englargement 16 into the tube wall.

The gauge 25 for checking the swaged connection of FIG. 1 may be seen in FIGS. 2, 3 and 4 and 5. The gauge 25 has a body 26 of U-shape such that a first larger cylindrical surface 27 is formed to fit over the surface 19 of the fitting of FIG. 1, and a smaller cylindrical surface 28 is formed to fit over the sleeve surface 20 of the fitting 10 in FIG. 1. As viewed in FIGS. 2 or 4, the U-shaped gauging means, in order to slide onto the body of the swaged fitting must have the surfaces at the opening parallel so that the gauge will fit the diameter which is the dimension to check. The gauge body 26 is also provided with an extension or finger 29 attached by a web 30 left after forming the slot 31 between the surface 28 and the surface 32 of finger 29. The cylindrical surfaces 27 and 28 are made just large enough to demonstrate adequacy of reduction in diameter of the swaged fitting surfaces 19 and 20 respectively.

The tube 22 prior to being inserted in the fitting sleeve 13 is marked with a band 33 having a width T to denote the range of tolerance desired for proper tube insertion. After marking the tube 22 with the band 33, it is inserted in sleeve 13 and the sleeve is swaged as shown.

The swaged fitting and tube are checked with the gauge 25 by slipping the body 26 over the sleeve 13 so that gauge surface 27 mates with the sleeve surface 19 and surface 28 mates with the sleeve surface 20. The gauge body 26 is moved axially toward the fitting body 11 until it is stopped by a reference surface on the shoulder 34 of the inner end of finger extension 29 abutting the open end of sleeve 13, since the surface 32 of this finger (FIGS. 4 and 5) is smaller in diameter than the adjacent surface 28. With the reference surface of shoulder 34 in abutment with the end of sleeve 13, the finger extension extends toward the marking band 33. If the outer end of the finger lies anywhere on the band 33 it is visually determined that the tube 22 is properly inserted. The body 26 of the gauge, when fitted over the swaged sleeve 13 with the reference surface of shoulder 34 in abutment with the end of sleeve 13, determines the correct diameter A and swaged length of sleeve surface 19 by the gauge surface 27, and surface 28 determines the correct diameter B of sleeve surface 20. In this manner the gauge 25 checks the three critical factors, namely swage diameter, swage length, and tube insertion depth, which make an acceptable joint between the sleeve 13 and the tube 22. This checking is accomplished in one operation of placing the gauge 25 in the position seen in FIG. 1. Should the U-shaped or semi-cylindrical surfaces 27 and 28,, or either of them, not fit over the surfaces 19 or 20 of the sleeve 13, the swaging operation is determined to be faulty, and the joint is also found to be faulty if the outer end of the finger extension 29 does not reach the marking band 33 or it if goes beyond this band. The marking band may have a width of about 0.30 inches to allow some variation in tube insertion depth and elongation of the sleeve 13 due to the swaging operation.

In FIG. 6 the modified gauge 35 is used to check a fitting 10A having a sleeve 13A swaged to but a single diameter A for its finished outer surface. The gauge 35 is similar to that seen in FIG. 3, except its body 26A is formed with one U-shaped or semi-cylindrical surface 27A. The finger extension 29A is provided with a shoulder 34A at the slot 31A, for the purpose of locating the gauge 35 against the outer end of the swaged sleeve 13A including a reference surface which abuts the open end of sleeve 13A, and fixing the location of the outer end of the gauge finger extension 29A for determining if the finger end touches the marking band 33A on the tube 22A. In the view of FIG. 6, the end of the finger 29A just reaches to the near edge of the band 33A to indicate that the tube has been inserted the minimum acceptable distance.

In FIG. 7 there is seen a swaging tool 36 of the connector disclosed in application Ser. No. 28,578. The fitting of FIG. 1 is located in the tool 36 between the swaging jaws, and the tube 22 to be connected thereto is inserted into the fitting until the prelocated marking band 33 is lined up with the outer face of the moving jaw 37. The swaging operation is performed and after the tool 36 has been removed the gauge is applied as heretofore described to check the accuracy of the result.

The foregoing description refers to alternate embodiments of a gauge for determining the correct or incorrect swaging and tube insertion characteristics for swaged tube fittings. The U-shaped or semi-cylindrical surfaces (FIG. 3) or the single surface 27A (FIG. 6), are adapted to slip over the swaged sleeve of a fitting to check the completeness of the swage. Over-swaging is not encountered since the tools have positive die-closure stops, but insufficient swage reduction adversely affects the grip on the tube. Therefore, when the U-shaped surface slips over the fitting sleeve it indicates sufficient swage reduction. In either gauge, the finger extension shoulder locates the gauge for checking the length of swage and the amount of insertion of the tube end in the sleeve of the fitting to assure the obtaining of sufficient grip on the tube.

What is claimed is:

1. A gauge device for use with a swaged fitting having a body with an open ended sleeve to receive a tube to be connected into the sleeve by swaging and in which the tube has a depth of penetration marking thereon; said gauge device including a body having a reference surface thereon, a first surface at one side of said reference surface sized to receive said body sleeve when properly swaged in diameter and length, and said body having a second surface located on the opposite side of said reference surface from said first surface, said second surface cooperating with the tube marking to indicate proper tube penetration into the fitting sleeve, said reference surface abutting the open end of the sleeve to position said first and second surfaces in gauging relation on the sleeve and tube.

2. The gauge of claim 1 wherein said first surface is semi-cylindrical to form a seat received over the fitting sleeve when properly swaged, and said second surface extends axially away from the cylindrical seat and outwardly toward the tube marking to visually show the extent of tube penetration into the sleeve.

3. The gauge of claim 1 wherein said first and second surfaces are off-set with said second surface set inwardly of said first surface to expose said reference surface to said first surface.

4. In a tube fitting gauge for use with swaged connections between a pre-marked tube and a fitting having an open ended tube receiving sleeve adapted to be swaged onto the tube with consequent reduction in diameter; said gauge comprising a body having a main portion formed with a U-shaped recess adapted to receive the fitting sleeve when swaged to an acceptable length and diameter, said gauge body having an extension portion directed to lie alongside the tube beyond the sleeve after swaging, the position of said marking on the tube relative to the end of said extension portion visually indicating the depth of insertion of the tube into the fitting sleeve, and said body having a reference surface on said extension portion adjacent said main portion to abut the open end of the tube receiving sleeve and locate the gauge in gauging position.

5. The gauge of claim 4 in which said extension portion has a shoulder adjacent said U-shaped recess, and said shoulder forming said reference surface for locating said gauge body on said fitting by engaging the end of the tube receiving sleeve.

6. A gauge device for visually checking the sufficiency of a swaged connection formed by fitting an open end sleeve over a tube having an index mark thereon for indicating the depth of tube insertion into the sleeve and then swaging the sleeve over the tube, said gauge device comprising a body having a first gauge portion formed with parallel gauging surfaces spaced apart a distance equal to a desired diameter of the sleeve after swaging, said body having a second gauge portion extending from said first gauge portion a length equal to a desired position of the index mark on the tube relative to the open end of the sleeve, and said body having a reference surface between said first and second gauge portions, said reference surface being located to engage the sleeve end for positioning said second gauge portion along the tube toward the location of the index mark, said reference surface engagement with the sleeve end being indicative of said parallel surfaces of said first portion receiving therebetween the sleeve after swaging.

* * * * *

UNITED STATES PATENT OFFICE
CERTIFICATE OF CORRECTION

Patent No. 3,762,059　　　　Dated October 2, 1973

Inventor(s) James A. Dawson

It is certified that error appears in the above-identified patent and that said Letters Patent are hereby corrected as shown below:

In column 1, line 42, "extenison" should read "extension".

In column 3, line 28, after "34A", insert ", including a reference surface which abuts the open end of sleeve 13A".

In column 3, lines 30 and 31, after "13A", delete "including a reference surface which abuts the open end of sleeve 13A".

Signed and sealed this 22nd day of January 1974.

(SEAL)
Attest:

EDWARD M. FLETCHER, JR.　　　　RENE D. TEGTMEYER
Attesting Officer　　　　　　　　Acting Commissioner of Patents